United States Patent [19]

Semon et al.

[11] 4,345,131

[45] Aug. 17, 1982

[54] METHOD AND APPARATUS FOR ELECTRODE TOOL WEAR COMPENSATION

[75] Inventors: Georges Semon; Alain Wavre, both of Geneva, Switzerland

[73] Assignee: Ateliers des Charmilles, S.A., Geneva, Switzerland

[21] Appl. No.: 130,618

[22] Filed: Mar. 17, 1980

[30] Foreign Application Priority Data

Mar. 29, 1979 [CH] Switzerland ............... 2897/79

[51] Int. Cl.$^3$ ................................................ B23P 1/14
[52] U.S. Cl. ........................... 219/69 G; 219/69 M; 219/124.02; 219/69 R; 68/210
[58] Field of Search ............... 219/69 G, 69 E, 69 M, 219/69 R, 124.02, 124.03, 111, 121 PV; 318/626, 652

[56] References Cited

U.S. PATENT DOCUMENTS

| | | | |
|---|---|---|---|
| 3,601,572 | 8/1971 | Check et al. | 219/69 G |
| 3,609,279 | 9/1971 | Giesbrecht et al. | 219/69 G |
| 3,614,371 | 10/1971 | Simpkins et al. | 219/69 G |
| 3,973,104 | 8/1976 | Ullmann et al. | 219/69 G |
| 4,049,942 | 9/1977 | Balleys et al. | 219/69 G |
| 4,071,729 | 1/1978 | Bell, Jr. | 219/69 C |

FOREIGN PATENT DOCUMENTS

2011653  7/1979  United Kingdom ............ 219/69 G

Primary Examiner—B. A. Reynolds
Assistant Examiner—M. Paschall
Attorney, Agent, or Firm—Hauke and Patalidis

[57] ABSTRACT

A method and apparatus for compensating for the wear of an electrode tool during machining by EDM of an electrode workpiece by the electrode tool. During penetration of the electrode tool into the electrode workpiece, relative displacement of the electrodes is stopped as soon as it reaches a predetermined reference position corresponding for example to a machining depth limit data entered in a control buffer memory. The reference position data is corrected as a function of the actual wear of the electrode tool which is measured by comparing the positions taken by the electrode tool when one of its active surfaces reaches the same reference position before and after a machining pass. The correction of the reference position data may be obtained either by successive approximations, or by a single calculation step effected after the first machining pass.

6 Claims, 3 Drawing Figures

METHOD AND APPARATUS FOR ELECTRODE TOOL WEAR COMPENSATION

BACKGROUND OF THE INVENTION

The invention relates to an EDM method and apparatus for controlling the depth of material removal from a workpiece electrode by means of an electrode tool, wherein electrical discharge machining of the workpiece is terminated when the depth of penetration of the electrode tool within the electrode workpiece has reached a predetermined value, such that the rate of wear of the electrode tool is taken into consideration and is automatically compensated for.

It is known to manually adjust a reference position paramater, such as a depth of cut limit for example, as a function of the theoritical wear of the active face of the electrode tool. However, such a process lacks precision because it is difficult to forecast in advance what the actual wear of the electrode tool will be for each machining operation. In the course of finish machining passes with decreasing machining rates, for example, it is necessary to take into consideration a wear correction factor each time the machining rate is changed.

The present invention is addressed to a new process and apparatus which permit to eliminate the inconveniences of the prior art by providing an automatic correction of the reference position data corresponding to the actual wear of an electrode tool irrespective of the machining rate. More specifically, the present invention provides a method and apparatus for positioning the electrode tool, prior to a machining pass, in a check position wherein one of the active surfaces of the electrode tool is disposed in a predetermined reference location, measuring the parameter of that location, effecting a machining pass, following the machining pass with a new check positioning of the electrode tool under the same conditions to obtain a difference between the two locations which is due to the wear of the electrode tool, and correcting the electrode tool reference data, or depth of cut limit, in the course of the following machining passes as a function of the difference between the two check locations.

SUMMARY OF THE INVENTION

According to the present invention, automatic correction of the depth of machining can be effected either by successive steps in the course of several machining passes effected with the same electrode tool, or by an exact calculation of the appropriate correction factor, taking into consideration the actual wear of the electrode tool in the course of a first machining pass. Either alternative mode of operation has particular applications in machining operations in which machining dimensions must very accurately be respected, for example during three-dimensional finish cut of several identical cavities by means of the same electrode tool. The novel method and apparatus of the invention permit to compensate for the cumulative wear of the electrode tool in the course of such machining operations.

BRIEF DESCRIPTION OF THE DRAWING

The many objects and advantages of the present invention will become apparent to those skilled in the art when the following description of an example of the best mode contemplated for practicing the invention is read in conjunction with the accompanying drawing, given for illustrative purpose only, and in which.

DETAILED DESCRIPTION OF THE PREFERRED EMBODIMENT

Figure 1:
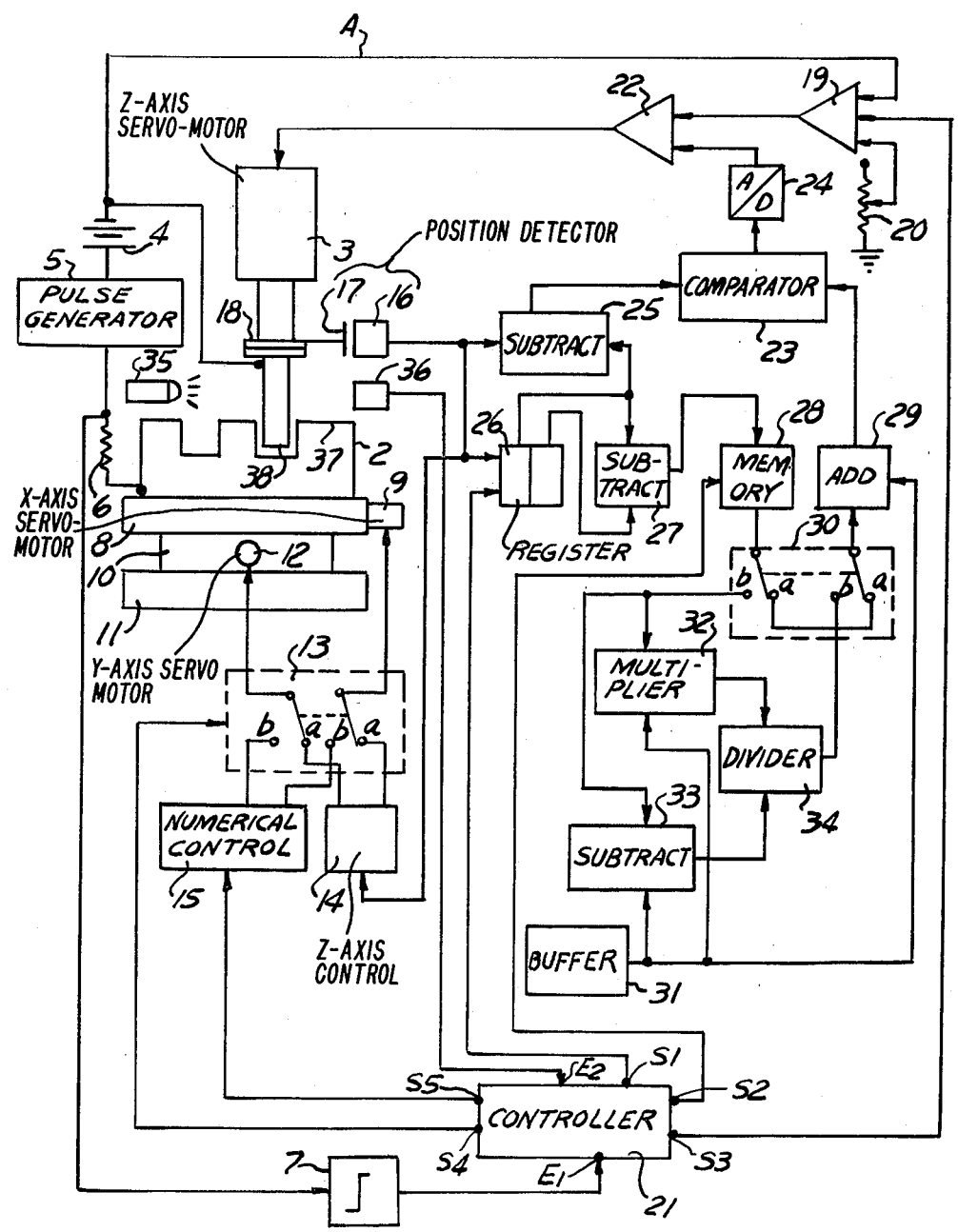
FIG. 1 is a block diagram of the logic and control circuitry of an example of apparatus according to the principles of the present invention.

Referring to FIG. 1, an EDM apparatus is schematically illustrated as comprising an electrode tool 1 controllably displaced relative to an electrode workpiece 2 by means of a servo-motor 3. Electrical discharges occurring between the electrodes are, in a manner well known in the EDM art, obtained from a direct current source 4 connected across the electrodes in series with a pulse generator 5 and a resistor 6, passage of machining pulse current through the resistor 6 causing a voltage drop which is detected by a Schmitt trigger 7.

The electrode workpiece 2 is mounted on a cross-slide table 8 displaceable transversely along one axis of motion, by a servo-motor 9, relative to a saddle 10. The saddle 10 is capable of linear displacement, along a second axis of motion perpendicular to the first axis, relative to a base 11 by means of a servo-motor 12.

A relay operated switch 13 enables the servo-motors 9 and 12 to be connected, according to whether connection is effected through the switch contacts a or b, either to a control circuit 14 for controlling the linear displacement of the workpiece electrode 2, or to a numerical control circuit 15 permitting to displace the workpiece electrode 2 according to a pre-established program. Vertical displacement of the electrode tool 1 is monitored by a position detector comprising, for example, a position transducer such as a stationary feeler 16 and a movable member 17 affixed to the support or holder 18 of the electrode tool 1 such as to be displaced in unison therewith.

In the example of arrangement schematically illustrated at FIG. 1, the control circuit 14 receives a signal from the position detection transducer 16–17 such as to vary the eccentricity of the motion of displacement of the electrode workpiece 2, or orbiting motion, as a function of the longitudinal feed of the electrode tool 1 into the electrode workpiece. The control circuit 14 may, for example, be a control circuit as disclosed in U.S. Pat. No. 4,057,703.

The voltage across the machining gap between the electrode tool 1 and the electrode workpiece 2 is applied by way of a line A to one of the inputs of a three-input differential amplifier 19, having a second input connected to the slide of a potentiometer 20 and a third input connected to the output S3 of a program controller 21.

The speed at which the servo-motor 3 displaces the electrode tool 1 is controlled by a signal at the output of a differential amplifier 22 having an input receiving the output signal from the differential amplifier 19 and another input connected to a binary numerical comparator 23 through a digital-analog converter 24.

The signal at the output of the position transducer 16–17 is applied to one of the inputs of a binary subtractor 25 and to one of the inputs of a shift register 26 provided with two buffer or memory banks.

The other inputs of the subtractor 25 and of the storage shift register 26 receive respectively the information stored in the first buffer or memory bank of the shift register 26 and the signal at an output S1 of the controller circuit 21. The information data stored in the second buffer or memory bank of the shift register 26 is compared to the information stored in the first memory bank by means of a subtractor 27 and the result, or difference, is held in a storage buffer or memory 28 upon receiving a load command pulse from an output S2 of the controller circuit 21. The information data stored in the storage memory 28 is transferred directly to an adder 29 when a double-pole double throw switch 30 is in the position shown at FIG. 1, through the terminals a of the switch which are interconnected by a jumper. The adder 29 is supplied a predetermined electrode tool reference position data or depth of cut limit held in a storage buffer 31.

If the moveable contacts of the switch 30 are each engaged with each of the fixed contacts of the terminals b, the information data from the storage memory 28 is applied simultaneously to one of the inputs of a first calculator or multiplier circuit 32 and to one of the inputs of a second calculator or subtractor circuit 33, the other two inputs of those circuits being connected to the output of the storage buffer 31. The numbers at the output of the calculator circuits 32 and 33 are fed to a third calculator or divider circuit 34, whose output is connected to one of the inputs of the adder 29 through the switch 30.

The controller circuit 21 is connected through one of its input E1 to the output of the Schmitt trigger 7, and through its other input E2 to the output of an optical position transducer comprising a light source 35 and a light detector 36. The relay switch 13 is operated by a signal at the output S4 of the controller circuit 21, and positioning of the electrode workpiece 2 according to a predetermined program is effected by the signals appearing at the output S5 of the controller circuit 21 when the switch 13 engages the terminals b.

Figure 2:
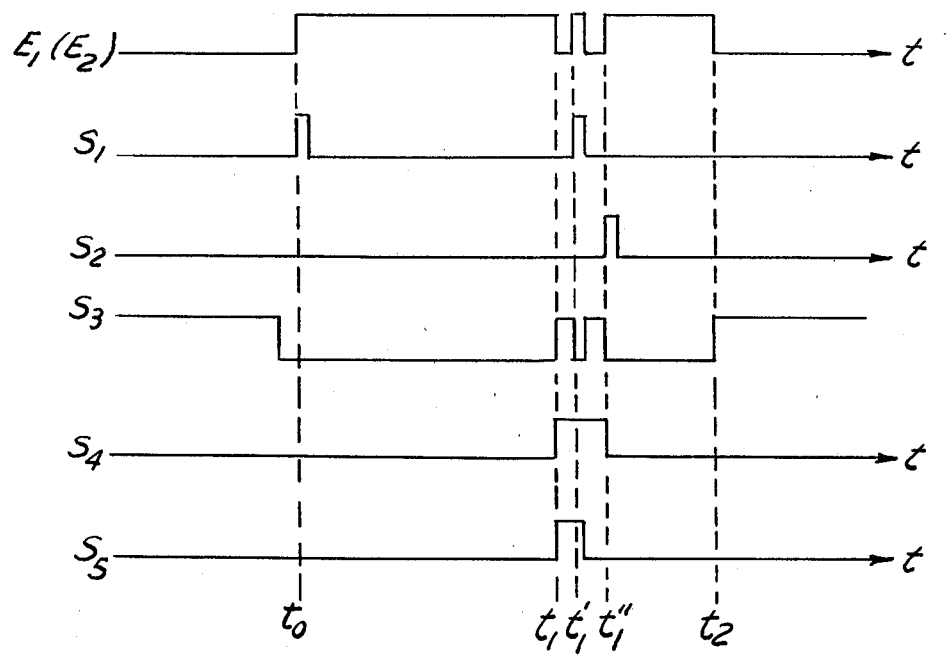
FIG. 2 is a wave-form diagram showing graphically the sequence of signals provided by a portion of the circuitry of FIG. 1.

The operation of the logic circuit of FIG. 1 is as follows:

The switch 30 is placed in the position a, and the machining dimension, or reference position data, is entered in the storage buffer 31. There is no information recorded in the storage memory 28, such that the information stored in the storage buffer 31 is applied without correction to one of the inputs of the binary comparator 23 and determines directly the limit value of the feed of the electrode tool 1 into the electrode workpiece 2. The sequence of operations is controlled by the controller circuit 21 which operates according to the diagram of FIG. 2.

Prior to effecting the first machining pass, the signal at the output S3 of the controller circuit 21, applied through the differential amplifiers 19 and 22, holds the electrode tool 1 at its upper position. As soon as the signal at the output S3 of the controller circuit 21 disappears the electrode tool 1 is advanced by the servomotor 3 toward the workpiece 2 until the active face 38 of the electrode tool engages the surface 37 of the electrode workpiece 2. The engagement of the electrodes is indicated, at time $t_0$, by a signal appearing at the output of the Schmitt trigger 7 which is applied to the input E1 of the controller circuit 21. At such time $t_0$, the output S1 of the controller circuit 21 provides a pulse applied to the input of the storage shift register 26 which stores in the first memory bank of the register the position of the electrode tool 1 as detected by the position detector transducer 16-17.

The electrode tool 1 is subsequently fed into the electrode workpiece 2 at a speed controlled by the differential amplifier 19 such as to maintain the electrical discharge voltage at the gap between the electrode tool and the electrode workpiece to a predetermined value as set by the position of the slider of the potentiometer 20. The subtractor 25 continuously determines the difference between the predetermined reference position data of the electrode tool stored in the first memory bank of the storage shift register 26 and the parameter or data representing the actual position of the electrode tool as monitored by the position detector transducer 16-17.

As soon as the electrode tool 1 reaches a position corresponding to the reference position data stored in the storage buffer 31, the binary comparator 23 supplies at its output a signal, converted into an analog signal by the digital-to-analog converter 24, which is applied to an input of the differential amplifier 22, such as to stop the feed of the electrode tool into the electrode workpiece according to the description of operation in U.S. Pat. No. 4,049,942.

When the electrode tool reaches a longitudinal position corresponding to the reference position data stored in the storage buffer 31, the signal at the input E1 of the controller circuit 21 disappears, at time $t_1$, and the signal appearing at the output S3 of the controller circuit 21 causes the electrode tool to retract. At this time $t_1$ the signal at the output S4 of the controller circuit 21 switches the relay switch 13 from its position a to its position b, and the signal appearing at the output S5 of the controller circuit 21 commands the control circuit 15 to displace the electrode workpiece 2 such that the active face 38 of the electrode tool is positioned above a non-machined area of the surface 37 of the electrode workpiece 2.

When the repositioning of the electrode workpiece is concluded, the signal at the output S3 of the controller unit 21 disappears and the electrode tool 1 is brought into contact with the surface 37 of the electrode workpiece 2 until electrical current passes between the active face 38 of the electrode tool 1 and the surface 37 of the workpiece 2. At the time $t'_1$, a pulse appears at the output S1 which causes the content of the first memory bank of the shift register 24 to be transferred to its second memory bank, and to record in the first memory bank the location of the electrode tool 1 as measured when current is passed between the electrode tool active face 38 and the surface 37 of the workpiece 2. The electrode tool 1 is retracted from the workpiece 2 under the control of the signal at the output S3 of the controller circuit 21, and the signal disappearing at the output S5 commands the control circuit 15 to align the workpiece 2 with the electrode tool 1 in the same position as prior to the first machining pass. When the two electrodes are aligned, the signals at the outputs S3 and S4 of the controller circuit 21 disappear and the electrode tool 1 is fed into the workpiece 2 to continue machining of the cavity in the workpiece in the course of a second machining pass. At time $t''_1$ marking the beginning of the second machining pass, the signal at the input E1 of the control circuit 21 provides a pulse at the output S2 which causes the difference between the two position parameters stored in the two memory banks of the shift register 26 to be stored in the storage memory 28, such difference being determined by the subtractor 27.

With the switch 30 in the position a, the circuit of FIG. 1 operates according to a first mode of operation, and the position difference recorded in the storage memory 28 is added to the initial reference position data, or cavity depth limit, stored in the storage buffer 31. This difference corresponds to the amount of wear of the active face of the electrode tool 1 in the course of the first machining pass. When the longitudinal position of the electrode tool 1 reaches, at time $t_2$, the updated reference position parameter data the cycle of operations is repeated, such as to measure the electrode tool wear during the second machining pass, and to add the numerical representation of the additional electrode wear to the updated reference position data to obtain a further updating of the updated reference position data.

Figure 3:
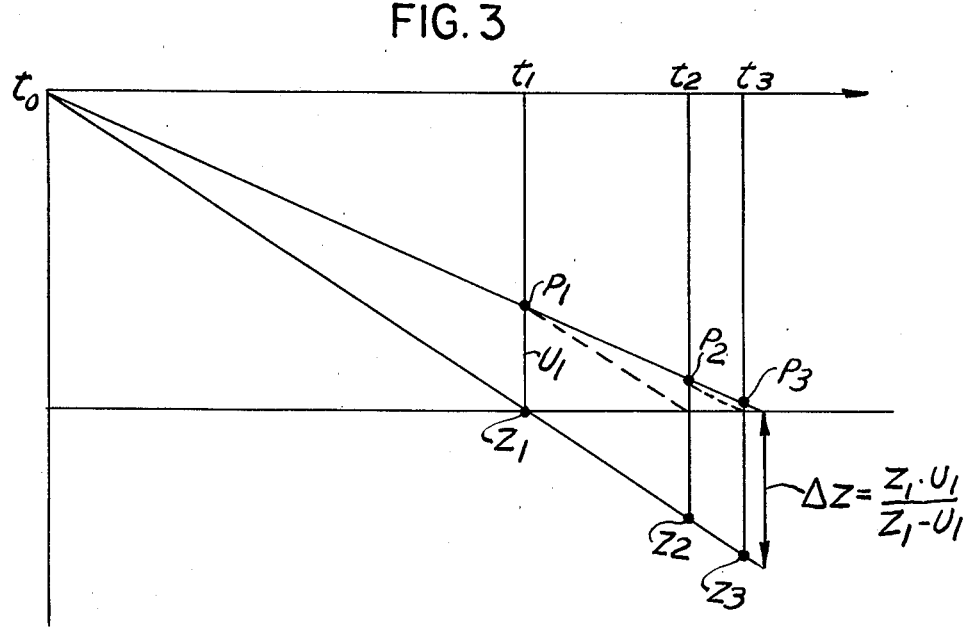
FIG. 3 is a schematic representation, in a diagram form, of the principle of operation of the apparatus of FIG. 1.

The diagram of FIG. 3 illustrates graphically the consecutive steps of correcting or updating the initial reference position data. The first machining pass starts at time $t_0$. When the longitudinal displacement of the electrode tool reaches the position corresponding to the initial reference position data or parameter Z1 at time $t_1$, the active frontal face of the electrode tool has reached only the position P1 because the electrode tool has worn of an amount U1. The amount of wear U1 of the electrode tool, measured as explained hereinbefore, is added to the reference position data Z1 in order to obtain the corrected or updated position reference data Z2. When the electrode tool reaches the position corresponding to the corrected or updated reference data Z2 during the second machining pass, the active face of the electrode tool reaches the position P2 in view of the additional electrode tool wear during the second machining pass. After the third machining pass the active surface of the electrode tool reaches a position P3 very close to the desired predetermined reference position data corresponding to Z1. If UR represents the relative wear of the electrode tool and n the number of consecutive corrections or updatings, the error between the parameter of the actual machined surface and the predetermined reference position data or machining limit Z1 as a function of the predetermined reference position data Z1 is obtained by the equation:

$$e=(UR/1+UR)^n$$

When the rate of wear of the electrode tool is not very large, it is sufficient to effectuate two or three consecutive corrections or updatings to obtain a resulting machining error which is practically negligible. For example, if UR=0.06 and n=3, e=0.00018.

The reference location of the active face 38 of the electrode tool 1 can also be detected as a result of the disappearance or appearance of a light beam emitted by the light source 35 and detected by the light detector 36. When using such a detector means, the signal applied to the input E2 of the controller circuit 21 is substituted for the signal applied to the input E1, and the transverse repositioning of the electrode workpiece by means of the relay switch 13 and of the control circuit 15 is no longer necessary.

In operations where it is desired to finish several identical cavities previously roughed out in the same workpiece, it is thus possible, by using the method of the invention, either to effectuate consecutive machining passes in the same cavity until complete correction of the limit of feed of the electrode tool is obtained and to subsequently effectuate a single machining operation on each of the other cavities, or to machine each cavity one after the other while effecting a single correction or updating for each cavity until obtaining a complete correction, and to effectuate subsequently an additional correction on each of the other cavities.

The exact amount of correction of the reference machining position data, or limit of depth of travel of the electrode tool, can be calculated after a single machining pass. To effectuate such a correction, the switch 30, FIG. 1, is switched over to the position b. The measured value U1 of electrode tool wear during the first machining pass is inserted into the calculator circuit at the same time as the reference value Z1 stored in the storage buffer 31, such as to calculate the exact correction or updating value as given by the equation:

$$\Delta Z=(Z1 \cdot U1)/(Z1-U1)$$

The multiplier circuit 32 calculates the product $Z1 \cdot U1$ simultaneously with the subtractor circuit 33 calculating the difference $Z1-U1$, and the divider circuit 34 divides the product by the difference. The quotient of the two obtained from the divider circuit 34 is added to the reference position data Z1 through the adder 29 and the exact machining reference position data is obtained as soon as during the second machining pass. The corrected reference data representing the limit of machining depth remains applied to the input of the binary comparator 23 during machining of other cavities of the same dimensions.

The initial reference position data stored in the storage buffer 31 could be increased by an estimate of the amount of wear of the electrode tool 1. In such a mode of operation, a number representing estimated wear must also be stored in the subtractor 27, such as to provide at the output of the subtractor a number corresponding to the error in estimating the electrode tool wear.

The electrode tool wear can also be measured on another area of its surface, for example on one of its lateral surfaces, and by means other than the means specifically shown at FIG. 1, for example as a function of the position taken by a feeler in engagement with one of the active surfaces of the electrode tool.

The automatic compensation of the invention for the reference position, or depth of cut limit, data of an electrode tool has particular applications to EDM processes wherein the relative motion of the electrodes is on a conical surface of revolution whose apex angle is a right angle. Under such conditions, the electrode tool is fed into the workpiece with a combined longitudinal and radial motion, such that the wear of the electrode tool can be measured on its front face as well as on its lateral surface.

Having thus described the present invention by way of a specific example of structure for practicing the method of the invention, modification whereof will be apparent to those skilled in the art, what is claimed as new is as follows:

1. A process for controlling the depth of material removal by an electrode tool from an electrode workpiece in an EDM apparatus, wherein a machining pass is terminated when the electrode tool has penetrated into the workpiece to a pre-established reference position limit, said process comprising bringing said electrode tool prior to effecting a machining pass to a first position whereby one of the active surfaces of the electrode tool reaches a reference location, recording the parameter of said first position, effecting said machining pass to said pre-established reference position limit, subsequently bringing said electrode tool prior to effecting a second machining pass to a second position whereby said active surface of said electrode tool reaches said reference location, recording the parameter of said second position, determining the amount of wear of said electrode tool as a difference between the parameters of said first and second positions, and adjusting the reference position limit in the course of a subsequent machining pass as a function of the difference between the parameters of said first and second positions.

2. The method of claim 1 wherein a predetermined number of consecutive machining operations is effected, and adding the difference between two location parameters after each machining operation.

3. The method of claim 1 wherein said reference position limit is increased after a first machining pass by a correction factor obtained by dividing the product of a value representing said reference position limit and of said difference value by the difference between those values.

4. An apparatus for controlling in an EDm apparatus the depth of material removal from an electrode workpiece by an electrode tool wherein material removal is terminated when the distance of penetration of the electrode tool within the electrode workpiece reaches a predetermined reference limit value, said apparatus comprising means for measuring the relative displacement of the electrodes in a predetermined direction, means limiting said displacement to a limit value, means for measuring the relative position of the electrodes when an active surface of said electrode tool reaches a locating position, means for determining the difference between two relative positions of the electrode measured at said locating position one before and the other after a machining pass, and means for correcting said predetermined reference limit value for a subsequent machining pass as a function of said difference, whereby the amount of penetration of said active surface of said electrode tool into said electrode workpiece at the end of said machining pass is substantially equal to said predetermined reference limit value.

5. The apparatus of claim 4 wherein means are provided for adding the value of said difference to said reference limit value, and further comprising means for repeating said adding after each machining pass.

6. The apparatus of claim 4 comprising means for multiplying said reference limit value by said difference, means for subtracting said difference from said reference limit value, means for dividing the product of said multiplication by the difference of said subtraction, and means for adding the quotient of said division to said reference limit value.

* * * * *